Patented June 24, 1930

1,765,534

UNITED STATES PATENT OFFICE

LOUIS CLEVELAND JONES, OF GREENWICH, CONNECTICUT, ASSIGNOR TO CHEMICAL ENGINEERING CORPORATION, OF NEW YORK, N. Y., A CORPORATION OF DELAWARE

PRODUCTION OF AMMONIA

No Drawing. Application filed March 24, 1925. Serial No. 18,060.

My invention relates generally to the synthetic manufacture of ammonia from its elements and is particularly adapted to improved processes for purifying the gaseous mixture of hydrogen and nitrogen in the manufacture of anhydrous ammonia.

The commercial production of synthetic ammonia requires the mixture of nitrogen and hydrogen in the proportion of one to three by volume, compressed to 100 or more atmospheres and passed over a suitable catalytic agent capable of stimulating the combination of the two gases whereby sufficient heat is produced to maintain the temperatures required for satisfactory yields.

The presence of certain impurities in the gases used for this synthetic manufacture of ammonia causes deterioration of the catalyst or poisons it so that its activity is largely diminished and ultimately such catalyst ceases to act. It is essential that such poisoned catalyst should be replaced or rejuvenated and this necessitates interruption of the production. Such impurities ordinarily present in this gas mixture are oxygen-containing compounds, chlorine, sulphur and phosphorus in various combinations.

In industrial practice, therefore, it is extremely advantageous in securing satisfactory yields to remove, if possible, even the last traces of these harmful impurities from the nitrogen-hydrogen mixture before treating same catalytically.

I have discovered that ammonia can be produced in good yield by preliminarily purifying the mixed nitrogen and hydrogen by introducing ammonia into the gas before compressing same. This ammonia may be used in any form, such as gas, anhydride or aqua in sufficient amount to make alkaline the aqueous condensate produced upon subsequent compression. I have further discovered that the amount of ammonia required does not ordinarily exceed .20 per cent of the volume of nitrogen-hydrogen mixture, but should be sufficient to combine in the condensed solution with any impurities capable of combining chemically with ammonia, or of dissolving into the ammoniacal condensate produced.

The particular impurities existing in this nitrogen-hydrogen mixture which are advantageously removed by my improved purification processes are carbon dioxide, oxides of sulphur and phosphorus, hydrochloric acid, hydrogen sulphide, chlorine, hydrocarbons, and various other compounds capable of being dissolved in, or chemically combined with, an aqueous solution of ammonia. In practicing this purification process it is assumed that the gaseous mixture to be treated contains moisture sufficient to form a condensate upon compression to the degree ordinarily required in the practical synthesis of ammonia catalytically.

The following is an example of how my invention may be carried into practical effect, but the invention is not to be confined to such example. The mixture of nitrogen and hydrogen is passed from a suitable receiver by a conduit leading to the gas compressor but before reaching the compressor a small amount of ammonia in any form, ordinarily not exceeding .20 per cent as hereinbefore described, is introduced into the gas passing through the conduit from any suitable container or other source of ammonia by means of a cock in the pipe leading from the container to the gas conduit. The gaseous mixture with such small amount of ammonia introduced therein is then compressed to say 100 or more atmospheres; then the resulting heated mixture from the compressor is passed through any suitable form of cooling condenser from which the ammoniacal condensate made distinctly alkaline is collected in a receiver while allowing the thereby purified gaseous mixture of nitrogen and hydrogen in their combining proportions to pass onward to be further treated over a catalytic mixture. This distinctly alkaline condensate removes by this operation the deleterious compounds and acids hereinbefore mentioned that can be dissolved in this aqueous condensate or can be chemically combined therewith.

I claim as my invention:

1. In the production of ammonia, the steps for purifying the gaseous nitrogen-hydrogen mixture from catalyst-poisoning compounds containing moisture which comprise introducing ammonia into said mixture before compression, and thereafter compressing and cooling same whereby the ammonia and said compounds therein chemically combine to form an ammoniacal condensate.

2. In the production of ammonia, the steps for purifying the gaseous nitrogen-hydrogen mixture from catalyst-poisoning compounds containing moisture which comprise introducing ammonia into said mixture before compression sufficient in amount to neutralize the acidic impurities therein, and thereafter compressing and cooling same whereby the ammonia and said compounds therein chemically combine to form an ammoniacal condensate.

3. In the production of ammonia, the steps for purifying the gaseous nitrogen-hydrogen mixture from catalyst-poisoning compounds containing moisture which comprise introducing ammonia into said mixture before compression sufficient in amount to make alkaline the acidic impurities therein, and thereafter compressing and cooling same whereby the ammonia and said compounds therein chemically combine to form an alkaline aqueous condensate.

LOUIS CLEVELAND JONES.